HIGH VOLTAGE BUS STRUCTURE

Filed Sept. 13, 1956

INVENTOR.
ROY H. ALBRIGHT
BY Ostrolenk, Faber, Gerb & Soffen
ATTORNEYS.

July 5, 1960 R. H. ALBRIGHT 2,944,101

HIGH VOLTAGE BUS STRUCTURE

Filed Sept. 13, 1956 8 Sheets-Sheet 2

INVENTOR.
ROY H. ALBRIGHT
BY Ostrolenk, Faber, Gerb & Soffen
ATTORNEYS

HIGH VOLTAGE BUS STRUCTURE

Filed Sept. 13, 1956

INVENTOR.
ROY H. ALBRIGHT

By Ostrolenk, Faber, Gerb & Soffen
ATTORNEYS

INVENTOR.
ROY H. ALBRIGHT
BY Ostrolenk, Faber, Gerb & Soffen
ATTORNEYS

July 5, 1960 R. H. ALBRIGHT 2,944,101

HIGH VOLTAGE BUS STRUCTURE

Filed Sept. 13, 1956 8 Sheets-Sheet 5

INVENTOR.
ROY H. ALBRIGHT

BY Ostrolenk, Faber, Gerb & Soffen
ATTORNEYS

July 5, 1960 R. H. ALBRIGHT 2,944,101

HIGH VOLTAGE BUS STRUCTURE

Filed Sept. 13, 1956 8 Sheets-Sheet 6

INVENTOR.
ROY H. ALBRIGHT
BY Ostrolenk, Faber, Gerb & Soffen
ATTORNEYS

July 5, 1960 R. H. ALBRIGHT 2,944,101

HIGH VOLTAGE BUS STRUCTURE

Filed Sept. 13, 1956 8 Sheets-Sheet 7

INVENTOR.
ROY H. ALBRIGHT

BY Ostrolenk, Faber, Gerb & Soffen
ATTORNEYS

July 5, 1960 R. H. ALBRIGHT 2,944,101

HIGH VOLTAGE BUS STRUCTURE

Filed Sept. 13, 1956 8 Sheets-Sheet 8

INVENTOR.
ROY H. ALBRIGHT

BY Ostrolenk, Faber, Gerb & Soffen
ATTORNEYS

United States Patent Office 2,944,101

Patented July 5, 1960

2,944,101

HIGH VOLTAGE BUS STRUCTURE

Roy H. Albright, Greensburg, Pa., assignor to I-T-E Circuit Breaker Company, Philadelphia, Pa., a corporation of Pennsylvania Filed Sept. 13, 1956, Ser. No. 609,744

23 Claims. (Cl. 174—99)

My invention relates to a high voltage bus structure and more specifically is directed to a metal enclosed isolated phase bus structure that can support voltages of the order of 138,000 volts.

The trend in electrical industry has been to utilize higher and higher voltages in distribution systems. At the present time, high voltage isolated phase bus structures are available which have voltage ratings up to and including sixty-nine kilovolts. In constructing metal enclosed isolated phase bus structures of this rating, previously known bus structures were utilized and the physical dimensions thereof were increased so as to meet the increased dielectric requirements.

However, this approach may not be utilized in the construction of a bus structure which must support one hundred thirty-eight kilovolts, since the greatly increased physical separation of the bus and its metal enclosure brings about many structural problems in supporting the bus and the enclosure. Some of the problems associated with the bus housing construction introduced in view of the required increase in physical dimensions of a bus which will support one hundred thirty-eight kilovolts are the torsional deflection in structural supporting members, methods for supporting the bus structure enclosure, and method for aligning the ends of adjacent enclosures so that they may be fastened to one another.

Other problems are introduced with respect to the actual fastening between adjacent housings so as to include gasket seals and insulation between adjacent enclosures which will allow for large changes in dimension between adjacent enclosures due to thermal expansion and contraction and to provide protection for the gaskets and the insulation.

A still further set of problems are introduced in the construction of the insulator supports which support the bus within the housing. That is, an insulator which is loaded in compression but still allows freedom of movement to compensate for different rates of expansion and contraction of enclosures and conductors is required. This problem is particularly severe in the case of a one hundred thirty-eight kilovolt bus structure since the insulator supports are extremely long and stresses resulting from cantilever loadings thereon are much higher than those that have been previously encountered in lower voltage rating bus structures.

A still further problem encountered is that of corona discharge at the disconnect switch within the metal enclosed bus structure in view of the higher voltage rating.

It is therefore a primary object of my invention to provide a novel bus structure for a metal enclosed isolated phase bus which will satisfy each of the above noted problems and particularly the last problem for the case of a one hundred thirty-eight kilovolt and higher bus structure while still being capable of being used in the lower voltage ratings such as sixty nine kilovolts.

The straight bus housings of my novel invention may be fabricated from sheet metal which is rolled into semi-cylindrical sections and welded together on longitudinal seams. Since these cylinders, however, are of a relatively large diameter or of a diameter sufficient to allow the entrance of maintenance personnel, they are quite flexible and do not have the rigidity required for mounting on a supporting structure or for supporting the insulators and buses mounted within.

In order to provide the desired rigidity, I provide circular reinforcing members which may be fastened in any desired manner to the outside of the cylindrical housing. This circular reinforcing member could, for example, be formed of channel sections which are rolled into semi-cylindrical sections and then welded to the outside of the relatively flexible housing. These channel sections are more specifically located along the axis of the cylindrical housing so that they will be in alignment with the insulator support member which supports the bus carrying insulator on the interior of the cylinder to thereby both reinforce the flexible cylindrical housing itself and to also reinforce the particular point of the cylindrical housing which mounts the internal insulators and is thereby subject to relatively high stresses.

Rigidity is also added to the ends of the cylindrical housing by means of further annular reinforcing structural members which are welded to the housing ends and provide the further function of adapting the housing to be connected to an adjacent housing.

The previously described circular or annular reinforcing member which is welded to the outside of the circular housing then has mounting feet attached thereto for mounting the bus enclosure to structural supporting members. While in the past, these mounting feet were attached directly to transverse structural members for supporting the bus structure, I provide a first longitudinal member to which the mounting feet of the bus housing are attached and thereafter fasten these longitudinal structural members to the ultimate transverse structural members. In so providing this novel construction, the mounting feet need not project beyond the housing dimensions and as will be seen in the following, easy alignment of any bus housing is provided in either a longitudinal, transverse, or vertical position.

It is to be noted that this type of adjustable alignment is essential for a bus structure of this size since there will be inaccuracies in fabrication of the bus structure and in view of its weight, there will be deflection in the support members. Thus my novel construction provides an easy means for the alignment of any bus housing section with respect to adjacent bus housings to be connected thereto as well as with respect to bus housings of adjacent phases.

Since the longitudinal structural member is now connected to a transverse structural member, a connecting means such as a bolt passes through a first slotted hole in the longitudinal structural member and a second slotted hole in the transverse structural member. These two slotted holes lie perpendicular to one another so that the bus housing may be shifted in either a longitudinal or transverse direction.

Alignment in a direction perpendicular to the axis of the cylindrical bus housing is obtained by providing an adjustable connection between the mounting feet connected to the bus housing and the longitudinal structural member to which it is attached. More specifically, a concentric screw arrangement is utilized in which a first screw threaded in the mounting foot positions the mounting foot with respect to the longitudinal structural member while the second concentric screw passes through the first adjusting screw and secures the mounting foot to the longitudinal structural member.

So as to further facilitate alignment of adjacent housing sections as well as to add to the bracing or reinforcing of the cylindrical housing section during transportation of the bus housing, end bracing members which comprise a plurality of radially extending bracing members which extend from the outer portion of the end of the circular housing and meet and are fastened at the center of the housing may be used. The point at which these radial members meet at the center of the circular housing may therefore allow the aligning of buses of adjacent housings when two sections are to be jointed and while the individual bus housings are in transit their ends are reinforced by this brace construction.

Accordingly, an important object of my invention is to provide a novel housing structure for a metal enclosed isolated phase bus which will support voltages of the order of one hundred thirty-eight kilovolts.

Another object of my invention is to construct a bus housing of the walk-in type by welding semi-cylindrical sections together and imparting rigidity to the assembled sections by welding annular bracing members along the outside of the cylindrical housing which is axially located adjacent to the insulator support position within the bus housing.

Another object of my invention is to provide additional reinforcing of a cylindrical bus housing by welding an annular shaped reinforcing member to the end of the bus housing which reinforcing member serves the further purpose of allowing interconnection between adjacent bus housings.

A still further object of my invention is to attach mounting feet to the reinforcing members of the cylindrical bus housing and to support the bus housing by fastening the mounting feet to longitudinal support structures and to thereafter mount the longitudinal support structure to a transverse support structure.

Yet a further object of my invention is to connect the longitudinal and transverse support structures through slotted connecting holes to thereby allow both longitudinal and transverse adjustment of the position of the bus housing.

Still another object of my invention is to provide adjusting means for adjusting the distance between the mounting feet of a circular bus housing and its longitudinal support structure so as to allow adjustment of the position of the bus structure in a direction substantially perpendicular to the axis of the bus housing.

Still another object of my invention is to provide end bracing members which extend radially inward from the end of the cylindrical housing and are connected together at an interior point of the housing to facilitate alignment between housing sections and to further brace the cylindrical housing during transportation thereof.

Since the bus housing for a bus system which is rated at one hundred thirty-eight thousand volts is so large, the interconnection between adjacent enclosures is complicated in view of the inherent inaccuracies in the enclosure construction and the relatively large changes in dimensions between adjacent enclosures due to thermal expansion and contraction.

In the bus structure of my novel invention, I provide very little space between housing sections and weld an annular shaped support member at the end of each bus housing section which first adds to the rigidity of the individual bus housing and secondly is adapted to receive a gasket which completes an air tight connection between adjacent units. The gasket utilized is constructed in such a manner that it will be effective even though housing ends are not in proper alignment or are not concentric. It is further constructed to allow a change in the distance between adjacent housings without being ruptured, this change in distance being due to thermal expansion and contraction or various deflections due to mechanical stress.

A clamping means is then positioned concentrically with the gasket which clamping means provides the mechanical connection and alignment between the two housings. This clamp is more specifically constructed to form a weatherproof connection with respect to the two housings and is electrically insulated from the two adjacent housings so as to decrease eddy current effects. The clamp protects the gasket from direct exposure to rain or snow conditions and further protects the gasket from puncture or radiation from the sun. Since the clamp is electrically insulated from the two adjacent covers as was previously mentioned, circulating currents will be isolated within a single housing but the clamp is made continuous so as to provide a continuous metallic shield for a particular bus run.

Accordingly, a further important object of my invention is to provide a novel connecting means for connecting adjacent bus housings to one another.

Another object of my invention is to connect an annular shaped reinforcing member to the outer periphery of the cylindrical bus housing and to further construct this reinforcing member to receive a gasket means for forming an air tight connection between adjacent housings.

Another object of my invention is to concentrically position a clamp with the above described gasket means for mechanically connecting and aligning two adjacent housings.

Another object of my invention is to provide a clamping means positioned concentrically with the gasket to protect the gasket against direct sun rays, puncture and moisture.

Still another object of my invention is to construct this clamping means in a plurality of sections so as to transmit an evenly distributed radial pressure to the ends of adjacent housings and provide a continuation of the metallic shield between the junction of two housings.

In my novel high voltage bus structure, the bus bars are supported by a plurality of radially extending insulators which are loaded in compression and which are supported by the bus enclosure. However, in view of the relatively large size of both insulator and housing for the case of a one hundred thirty-eight kilovolt bus structure, the longer insulator will be subject to considerable bending stress due to different rates of expansion and contraction of the enclosures and conductors.

I therefore provide a flexible insulator support which can be adjusted in both a radially and angular direction. Hence, when the insulator and its supported bus are initially installed, the support member may be both radially and angularly positioned so as to achieve the best compression loading for the insulator and to allow both angular and radial flexing upon the occurrence of bending stress or compression stress above a predetermined value.

Accordingly, another important object of my invention is to provide a novel support means for bus structure insulators.

Another object of my invention is to provide for a novel support means for flexibly mounting an insulator support to thereby decrease compression and bending stress within the insulator supported thereby.

Another object of my invention is to provide a supporting means for a bus structure insulator which can adjust both the radial and angular position of the insulator.

In providing a disconnect switch for a one hundred thirty-eight thousand volt bus structure, the danger of corona discharge is considerably increased. I therefore provide a novel disconnect switch for a high voltage bus which is supported in a bus housing of the type described above and is connected to adjacent bus housings in the manner heretofore described. The switch current carrying parts are modified by placing corona rings on both the movable switch members and the stationary switch members so as to reduce corona discharge and raise the insulation level. These corona rings are arranged on each side of each set of insulators so as to shield conductor parts, blade parts, and insulator saddles supporting these parts. The corona rings are further constructed to have large radii so as to reduce the intensity of the electric field at the surface of the rings and the rings are made concentric so that a uniform electrical field exists at their periphery.

Similarly, all sharp or small radii projections are substantially eliminated in the switch so as to avoid local high intensity electric fields.

Accordingly, another object of my invention is to provide a novel disconnect switch for a high voltage bus structure.

Another object of my invention is to place corona rings on the switch blade and the stationary conductors of the disconnect switch of a high voltage bus structure so as to reduce corona discharge and raise the insulation level.

Another object of my invention is to provide a disconnect switch for a high voltage bus structure in which both the housing and the means for connecting it to an adjacent housing are of the type described hereinabove.

These and other objects of my invention will become apparent when taken in conjunction with the drawings in which.

*Housing construction*

The housing construction of my novel high voltage bus structure which is capable of voltage ratings of the order of 138,000 volts is most clearly seen in connection with Figures 1 through 8.

Figures 1, 2, 3:
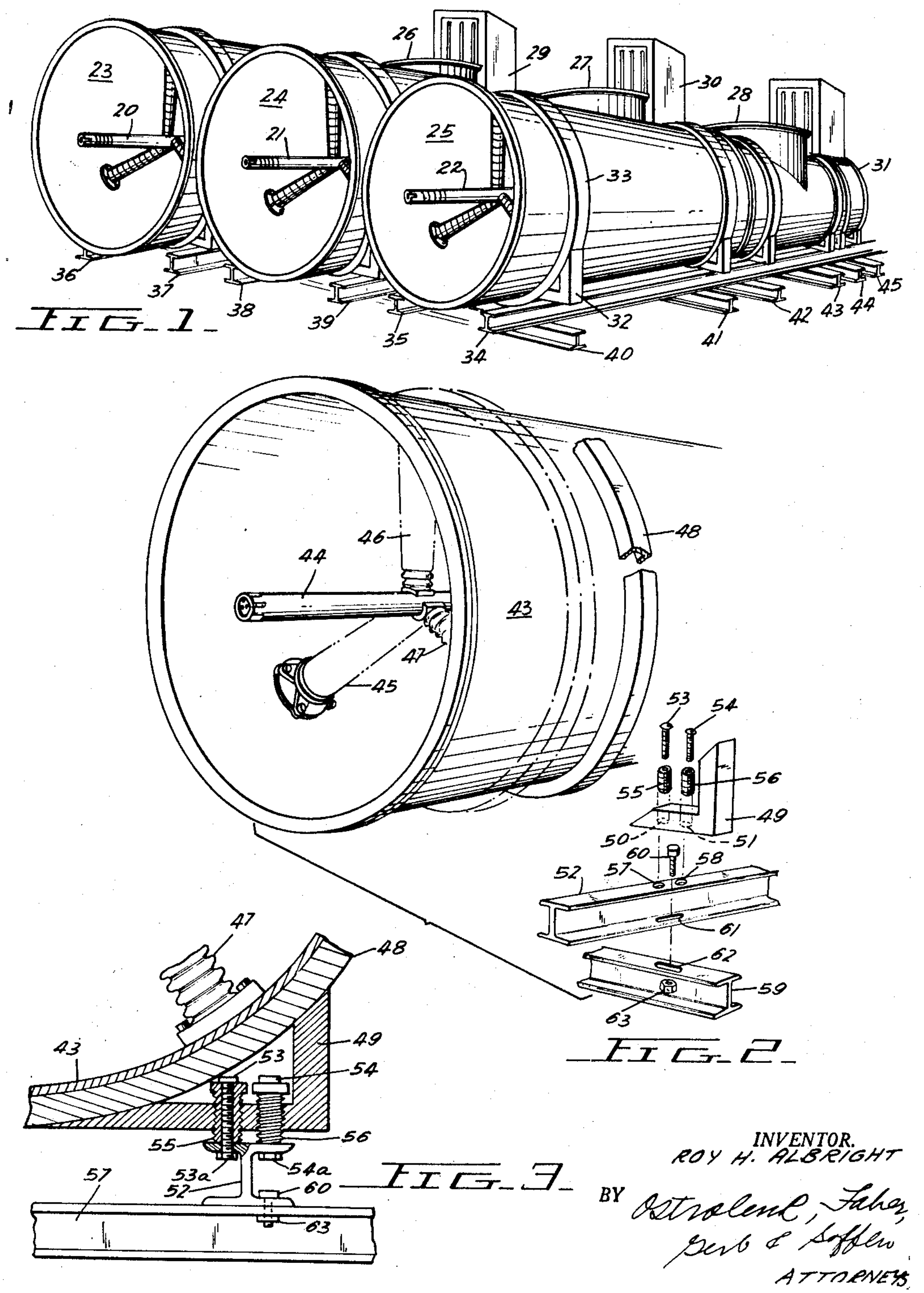
Figure 1 is a perspective view of three metal enclosed isolated phase buses which could conduct three phase alternating current.
Figure 2 shows an exploded perspective view of a portion of one high voltage bus housing which is constructed in accordance with my novel invention and specifically illustrates the manner in which the bus housing position can be varied in a longitudinal, transverse or vertical direction.
Figure 3 is a cross-sectional view taken through the mounting foot of the bus of Figures 1 and 2 and specifically illustrates the manner in which the bus may be adjustably positioned in a direction perpendicular to its axis.

Referring first to Figure 1, a three phase isolated phase bus system is seen as comprising the buses 20, 21 and 22 which are isolated from one another by their metallic housings 23, 24 and 25 respectively. While Figure 1 shows a three phase system, it is to be understood that my novel bus construction could be used for any type system using a housed or enclosed bus. Each of the bus housings 23, 24 and 25 are metallic cylinders which could have been formed of welded semi-cylindrical members. In view of their extremely high voltage rating, which could be of the order of 138,000 volts, these housings are flexible and in further view of their large size, manufacturing tolerances cannot be held as well as in the case of smaller bus housings so that they may not be of uniform size or shape.

A second bus housing section is then attached to bus housings 23, 24 and 25 and comprises the T-housings 26, 27 and 28 respectively which allow for a T-connection or, more generally, for a change in the direction of buses 20, 21 and 22. So that the structure of Figure 1 may be generalized, still another housing section comprising the disconnect switches 29, 30 and 31 is then seen as being connected to bus housings 26, 27 and 28 respectively.

It is to be understood that in a complete bus distribution system that many straight through bus housings such as housings 23, 24 and 25 will be connected adjacent one another so as to effect the desired power distribution and bus housings for changing the direction of the bus such as the T-shaped housings 26, 27 and 28 will be utilized in conjunction therewith. Similarly, disconnect switches such as switches 29, 30 and 31 will be placed where desired.

In order to provide mounting of the bus housings, the bus housing 25 of Figure 1 has a mounting foot 32 attached thereto which is secured to the annular shaped reinforcing member 33 of the housing 25. In a like manner, other mounting feet 32 are provided along the bus housing. Although it cannot be seen in Figure 1, each of the bus housings 23 and 24 are provided with mounting feet similar to the mounting feet 22 of bus housing 25. The mounting feet 32 on one side of bus housing 25 are then fastened to the longitudinal supporting member 34 while similar mounting feet on the other side of bus housing 25 are supported by longitudinal supporting member 35.

In a similar manner longitudinal supporting members 36 and 37 will support the mounting feet of housing 23 while longitudinal support members 38 and 39 will support the mounting feet of housing 24.

Each of the longitudinal mounting structures 34 through 39 are then in turn mounted to transverse supporting structures such as the I-beams 40, 41, 42 which provide the ultimate support for each of the bus housings.

Referring now to Figure 2, which shows an exploded perspective view of the end of a bus housing 43 similar to the bus housings seen in Figure 1, the bus housing 43 which is a circular metallic member supports the bus 44 internally positioned therein by means of the radially extending insulators 45, 46 and 47. In view of the required large diameter of the circular housing 43 for the extremely high voltage range in which my novel bus structure can operate, the housing 43 is relatively flexible and I therefore provide an annular shaped reinforcing member 48 of Figure 2 which when in the assembled and dotted-line position of Figure 2 is fastened to the housing in any desired manner such as welding.

Reinforcing member 48 could, if desired, be formed of two channel shaped members which have been rolled to a semi-circular form.

It is to be noted that the position at which insulators 45, 46 and 47 are connected to the housing 43 registers axially with the reinforcing member 48. Thus, reinforcing member 48 not only reinforces the relatively flexible cylinder 43 but further provides physical strength at points of connection of insulators 45, 46 and 47 which will be points of relatively high stress in the housing.

As seen in Figures 2 and 3, a mounting foot 49 is fastened to the reinforcing member 48 in any desired manner, this mounting foot 49 being a structural aluminum channel having threaded holes 50 and 51 therethrough at the base of the angle.

In a like manner, a second mounting foot is positioned on the other side of the housing 43 and is attached to the other side of reinforcing member 48 in a similar manner.

A longitudinal structural support member such as the I-beam 52 is then positioned to mount the mounting foot 49, the I-beam 52 further mounting each of the mounting feet which are longitudinally distributed along the full length of housing 43. Figure 2, however, only shows one of these mounting feet. Thus, I-beam 52 will function as did the I-beam 34 of Figure 1 in mounting each of the mounting feet 32 of the housing 25 of Figure 1.

The connection between mounting foot 49 and I-beam 52 of Figures 2 and 3 is affected by the bolts 53 and 54 which protrude through apertures in the adjusting bolts 55 and 56 to mate with openings 57 and 58 respectively in the I-beam 52 and as best seen in Figure 3, are fastened by nuts 53*a* and 54*a* respectively.

The bolts 55 and 56 as seen in Figure 3 are in threaded engagement with apertures 50 and 51 of the mounting foot 49 and butt against the surface of I-beam 52. In view of the butting engagement between the end of bolts 55 and 56 and the surface of the I-beam 52, it is clear that by rotating bolts 55 and 56 when the nuts 53*a* and 54*a* are loosened, the distance between mounting foot 49 and supporting I-beam 52 will be varied. Thus the bolts 55 and 56 can adjustably position the bus housing 43 of Figure 2 in a direction perpendicular to the axis of housing 43.

Thus, in operation the vertical positioning of housing 43 is first achieved through bolts 55 and 56 and the bolts 53 and 54 which are fastening bolts are then tightened in their threaded engagement with the I-beam 52 so as to maintain the mounting foot 49 in its position with respect to I-beam 52.

The longitudinal structural member 52 may then be connected to a transverse structural member which ultimately supports the complete bus housing. As may be seen in Figures 2 and 3, the longitudinal I-beam 52 is connectible to the transverse structural member or I-beam 59 by means of the bolt 60 which cooperates with slotted apertures 61 and 62 in I-beams 52 and 59 respectively. The bolt 60 may then be fastened into position by its cooperating nut 63.

Apertures 61 and 62 are seen to be slotted in perpendicular directions in Figures 2 and 3. This type of construction will therefore allow adjustment of the position of bus housing 43 in the direction of the slot 61 or the longitudinal direction as well as in the direction of slot 62 or the transverse direction. After aligning the bus both longitudinally and transversely, as desired, the bolt 60 and its cooperating nut 63 may then be tightened in place so as to maintain this positioning.

Accordingly, the structure set forth in Figures 2 and 3 will allow for longitudinal, transverse and vertical positioning of the bus housing 43. If now this specific construction of Figures 2 and 3 is provided for each bus housing of a system such as the system of Figure 1, it is clear that the bus housings may be easily and properly aligned in any direction with respect to one another.

While the above construction of Figures 2 and 3 has been set forth for the case in which the bus runs in a horizontal direction, this same novel structure is easily adapted to the case of a bus running in a vertical direction.

Figures 5, 6:
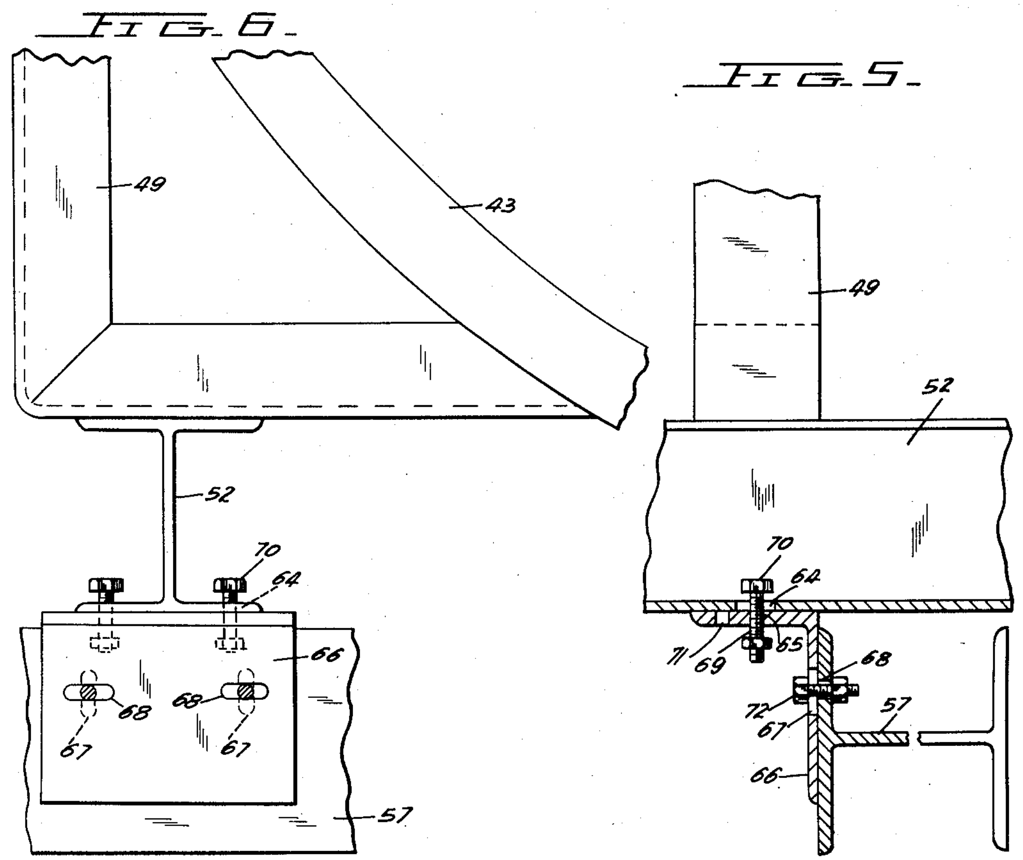
Figure 5 shows the manner in which the bus housing of my novel invention could be mounted when the bus axis is vertical.
Figure 6 is a front view of Figure 5.

Another adjustable connection for bus housing 43 and its supporting structure may be seen in Figures 5 and 6, which show a fragmentary portion of the bus housing 43 with the mounting foot 49 fastened to the I-beam 52 in any desired manner such as a bolt connection or a weld. Here again the I-beam 52 is a longitudinal structural member or a structural member which runs parallel to the axis of the bus housing. The longitudinal support member 52 is then provided with a slot 64 which cooperates with aperture 65 of the angle 66. The angle 66 is further provided with a slot 67 which cooperates with slots 68 of the transverse support member or I-beam 57.

In the construction set forth in Figures 5 and 6, longitudinal adjustment of the positioning of housing 43 is effected by the positioning of slot 64 of I-beam 52 with respect to the opening 65. Upon achieving the desired longitudinal positioning the bolt 69 and its cooperating nut 70 will lock the member 52 into the desired position with respect to angle 66. This position may be further maintained by providing an additional aperture 71 in angle 66 and to use this aperture as a guide for drilling a second hole in the I-beam 52 after positioning thereof for receiving a second and reinforcing bolt connection.

Transverse adjustment and adjustment in a direction perpendicular to the axis of the housing 43 is achieved by positioning slot 68 of the I-beam 57 with respect to the perpendicular slot 68 of the angle 66 until bus 43 is positioned in the desired transverse position and the desired position in a direction perpendicular to its axis.

The bolt means 72 may then be passed through the slots 67 and 68 to maintain housing 43 in its adjusted position. Hence in the embodiment of Figures 5 and 6, three dimensional adjustment of the position of housing 43 is achieved by interposing an auxiliary angle 66 between the support member 52 and the support member 57. Clearly this same type of construction can be utilized for both horizontal and vertical running bus systems.

Figure 7:
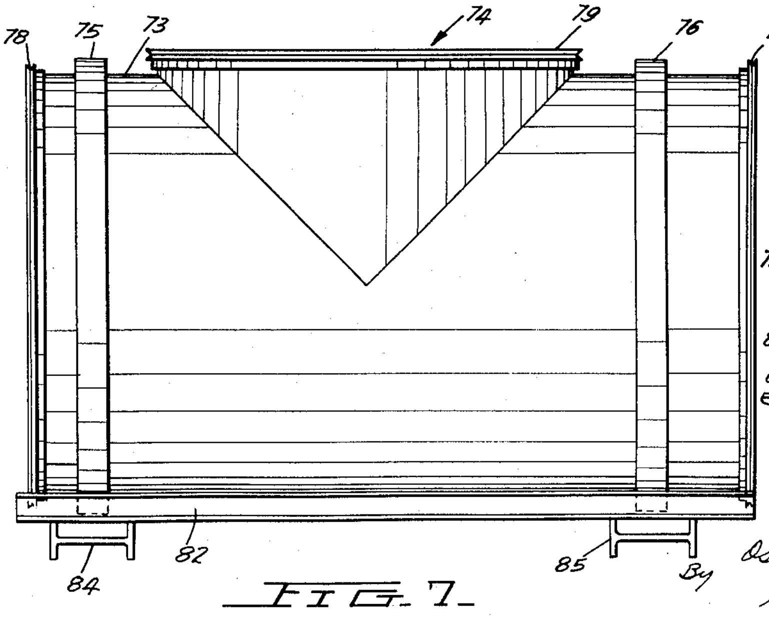
Figure 7 shows a side view of the bus of my novel invention when the bus housing is modified to form a T-connection.
Figure 8:
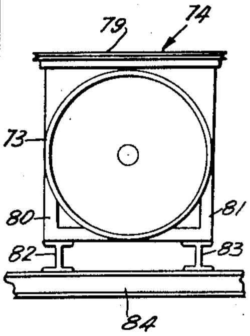
Figure 8 is a front sectional view of Figure 7.

Figures 7 and 8 show a side and front view respectively of a bus housing for providing a T-section as has been shown in Figure 1 for the T-sections 26, 27 and 28. In Figures 7 and 8, this T-section bus housing 73 is provided with an opening indicated generally at 74 for connecting a bus which runs perpendicular to the axis of housing 73. This T-housing is further seen in Figure 7 as having reinforcing members 75 and 76 which are similar to the reinforcing member 48 of Figure 2 and are further provided with end reinforcing members 77 and 78 along the length of the housing and end section 79 for the opening 74 in the side of housing 73.

As will be described more fully hereinafter, these end reinforcing members 77, 78 and 79 are so adapted as to allow connection between the T-shaped bus duct unit of Figures 7 and 8 and adjacent bus duct units.

As shown in Figure 8, mounting feet 80 and 81 are connected to the longitudinal support members 82 and 83, respectively, which are in turn connected to the transverse structural member 84 for the ultimate support of bus housing 73. As best seen in Figure 7, a second transverse structural member 85 is provided for further support in coordination with transverse member 84 for supporting the bus housing 73. It is to be noted that the method of adjustably supporting bus housing 73 could be identical to that described in either Figures 2 and 3 or Figures 5 and 6.

During transportation of the bus unit, the bus housing will be subject to stresses which may not appear during installation and operation thereof. So as to further support the end of the bus housing, a bracing member which comprises the radially extending members 86, 87, 88, 89, 90 and 91 wherein one end of these members is connected to the end portion 92 of a bus housing while their interior portions are connected to a plate 93 having an aperture 94 therein. The connection of radially extending members 86 through 91 at the end of the bus housing and at the horizontally located plate 93 may be provided by any desired means such as bolts or rivets. This bracing member then provides two functions. The first function is clearly that additional support is given to the end portion 92 of the bus housing. A second function is provided, this being that the aperture 94 in the plate 93 locates the center of the bus supported by insulators 95, 96 and 97 so as to facilitate the alignment between this bus and the bus of an adjacent housing when these two housings are connected to one another. Thus, once the housings are aligned with respect to one another, the bracing members 86 through 91 may be removed from the end portion 92 of the housing and the two adjacent units may then be finally connected together in a manner which will be described hereinafter.

*Connection between adjacent bus housing sections*

Figures 4, 9, 12:
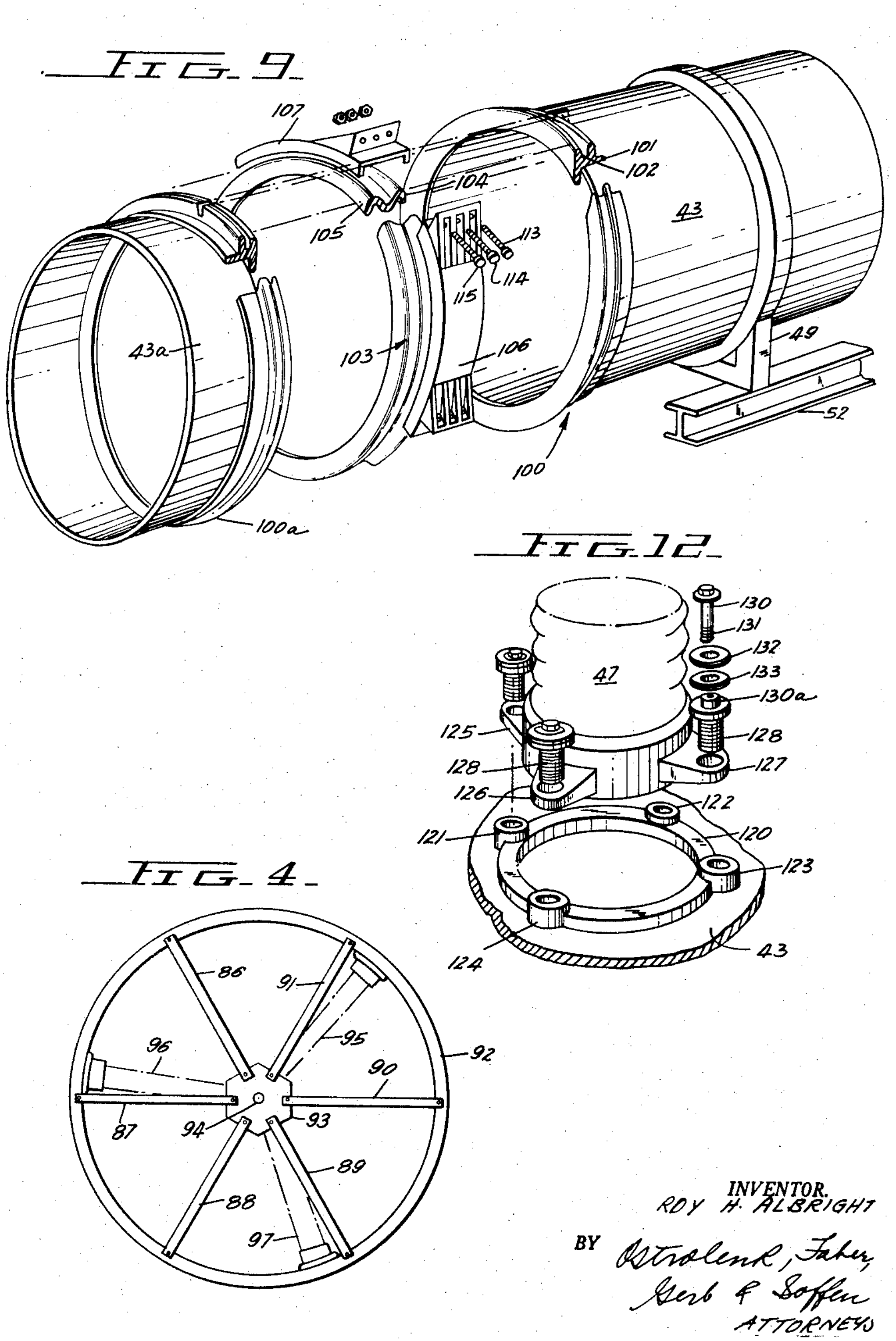
Figure 4 shows a front view of a bus housing wherein a bracing member is connected at its end so as to facilitate alignment of adjacent bus members and to further reinforce the bus housing particularly during transportation thereof.
Figure 9 is an exploded perspective view of a portion of the bus housing of my novel invention and specifically illustrates the manner in which adjacent buses are connected together.
Figure 12 is a fragmentary perspective view showing the manner in which the insulator support is attached to a cooperating support which is an integral part of the interior of the bus housing.
Figure 10:
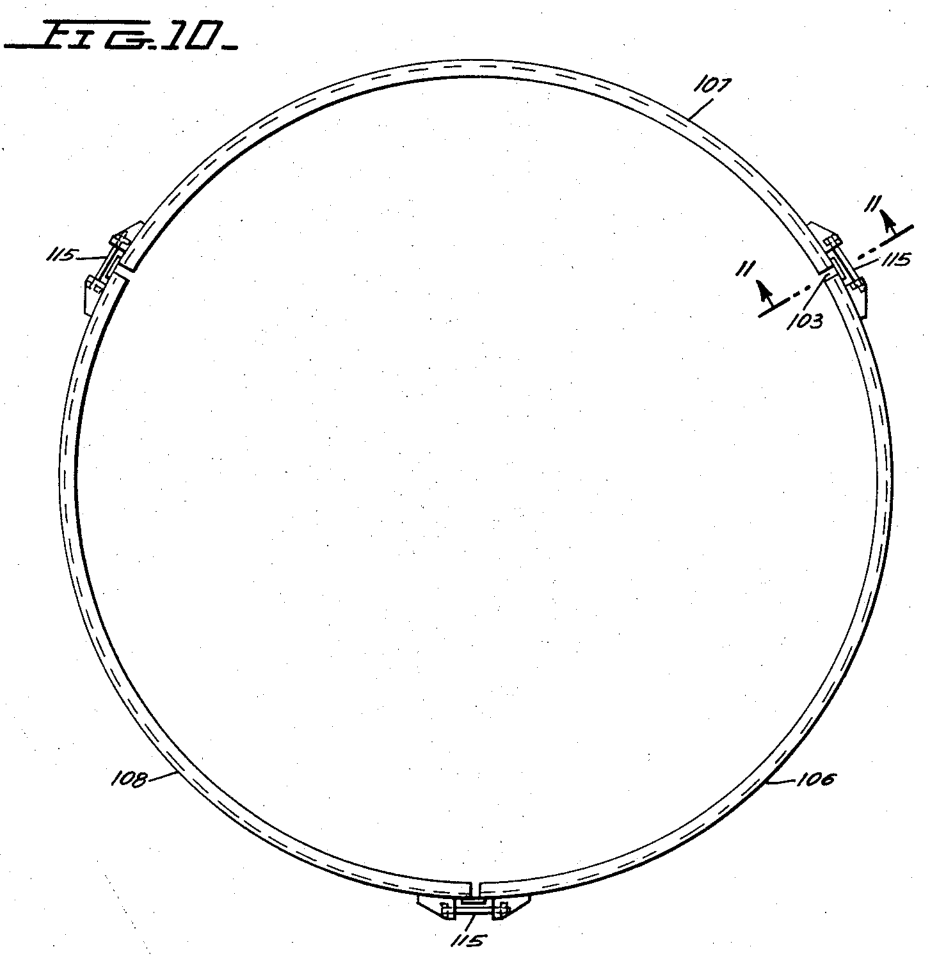
Figure 10 is a front cross sectional view taken through the point of junction between adjacent bus housings.
Figure 11:
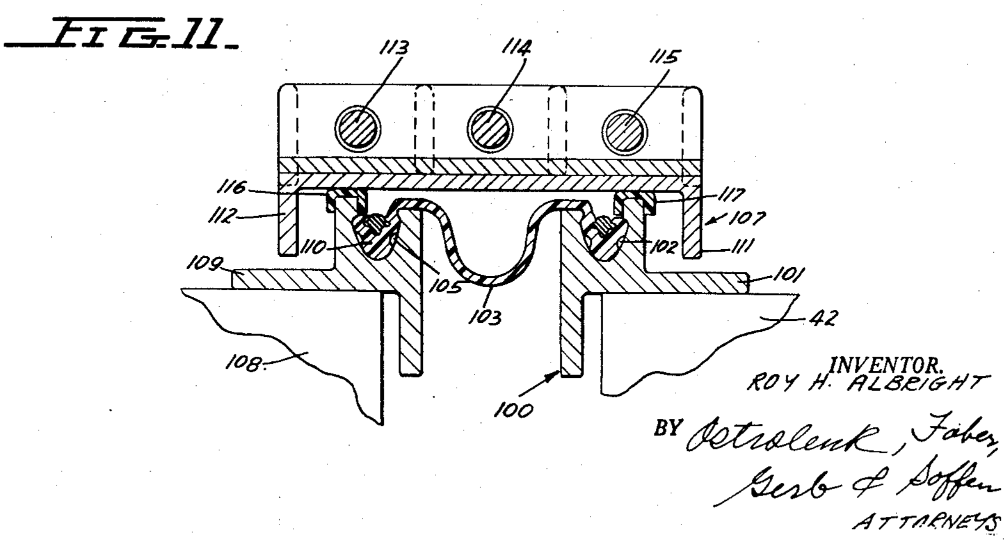
Figure 11 is a view of Figure 10 when taken across the lines 11—11 and specifically illustrates the configuration of the member fastened to the end of each housing for reinforcing its corresponding housing and accepting the gasket connection and the mechanical clamping connection.

In view of the greater inaccuracies in housing dimensions, greater degrees of misalignment and increased expansion and contraction due to temperature changes of a bus housing which must serve to operate under voltages of 138 kilovolts, I have invented a novel means of interconnecting adjacent bus housings. This method of bus housing connection is seen in Figures 9, 10 and 11 where Figure 9 shows an exploded perspective view of the manner in which a housing such as the housing of Figure 2 may be modified. Figure 10 shows a sectional view of the completed junction between two housings, and Figure 11 shows a detailed sectional view of my novel connecting structure.

As seen most clearly in Figure 9, bus housing cover 43 has a ring-shaped member 100 connected to the end thereof at the protruding flange 101 of the ring 100.

Therefore, this ring, as well as serving a part in the interconnection between two adjacent housing sections, further serves as a reinforcing member for the housing to which it is connected. Ring 100 then has a groove 102 cut therein which is adapted to receive a flexible gasket 103 which has a radially extending portion 104 which fits into and is sealed in groove 102 of the ring 100. Gasket 103 is provided with a second radially extending portion 105 which cooperates with a groove similar to groove 102 of a ring attached to the housing 108 which is to be connected to bus housing 42. A plurality of ring-shaped clamps, two of which are seen in Figure 9 as clamps 106 and 107, then extend around the circumference of ring 100 and the ring 109 of the bus housing 108 to be connected to ring 100, these clamps maintaining the ring-shaped portions in mechanical engagement with respect to one another.

This construction may be further seen in Figure 11 where ring 100 has the flange 101 welded to the housing 43 and in a like manner the ring 109 is welded to the housing 108. The gasket 103 then has its radially extending portions 103 and 105 inserted in the grooves 106 of the ring 100 and 110 of the ring corresponding to the housing 108.

Figure 11 further shows the manner in which the rings 106, 107 and 108 of Figures 9 and 10 are concentrically positioned with respect to the gasket 107 so that extending portion 111 and 112 of ring 107 straddles the shoulders of rings 109 and 101 so as to maintain a mechanical connection between the two housing sections 43 and 108. Once the two housings are positioned with respect to one another, each of the plurality of clamps 106, 107 and 108 may be connected together as by the cooperating screws 113, 114 and 115 which interconnect adjacent ends of clamps 106 and 107. While a single clamping means could have been utilized, it is preferable to use a plurality of clamping means so as to allow a more equal distribution of radial pressure on the bus housing junction.

Rings 109 and 100 of Figure 11 further have an insulating member 116 and 117 which serves to electrically insulate housings 43 and 108 from one another to thereby contain circulating current within only a single housing.

It is to be noted that gasket 103 has a U-shaped cross-section and that extensions 111 and 112 of clamp 107 is not in direct contact with the shoulder of the rings 100 and 109. It is this novel construction that will allow a change in the distance between the ends of the housing sections 43 and 108 due to thermal contraction and expansion while still forming a mechanical connection therebetween. The U-shaped construction of gasket 103 will allow a moisture-tight connection between the housings 43 and 108 even though these two housings may not be perfectly aligned. After the connection of the plurality of clamps 106, 107 and 108, however, the ends of the two housings 43 and 108 will for all practical purposes be drawn into alignment with one another.

Although clamps 106, 107 and 108 of Figure 10 are seen to be electrically insulated from housings 108 and 43 of Figure 11 by means of insulating spacers 116 and 117, it is to be noted that the clamps 106, 107 and 108 do not intercept the metallic shielding action offered by housings 43 and 108.

Furthermore, as well as performing a mechanical connection between these two adjacent housings and completing the metallic shield, the clamps 106, 107 and 108 protect the gasket 103 from direct sunlight which could cause or accelerate deterioration of the gasket material. Similarly, the clamp protects the gasket material from puncture and also controls the course of water so that there is little chance for moisture to seep into recesses where the gasket is locked into the ring grooves 102 and 110.

*Insulator support*

In view of the increased physical dimensions of an insulator for supporting a bus from the bus housing when this bus housing is rated at a value of the order of 138 kilovolts, the insulator is subject to severe problems, related to increased stresses due to cantilever forces and adjustment of the insulator position. In order to overcome these problems, I have invented a novel insulator support which is so constructed as to flexibly mount the insulator to decrease the effective bending stress and to further mount the insulator so that its position may be adjusted in both a radial and angular position.

The perspective view of Figure 12 shows a portion of the interior of housing 43 and the insulator 47 which is to be connected to this housing portion. A support base 120 is fastened to the housing portion 43 in any desired manner such as welding in an axial position along the housing 42 so that the base 120 will be in registry with a reinforcing member such as member 48 of Figure 2.

The support base 120 is then provided with four threaded apertures 121, 122, 123 and 124 which will receive the mounting bolts of the insulator 47. The base of insulator 47 is provided with projecting lugs seen in Figure 12 as lugs 125, 126 and 127 through which an adjusting screw and fastening screw protrude where the fastening screws of lugs 125, 126 and 127 cooperate with threaded apertures 121, 124 and 123, respectively.

Figure 14:
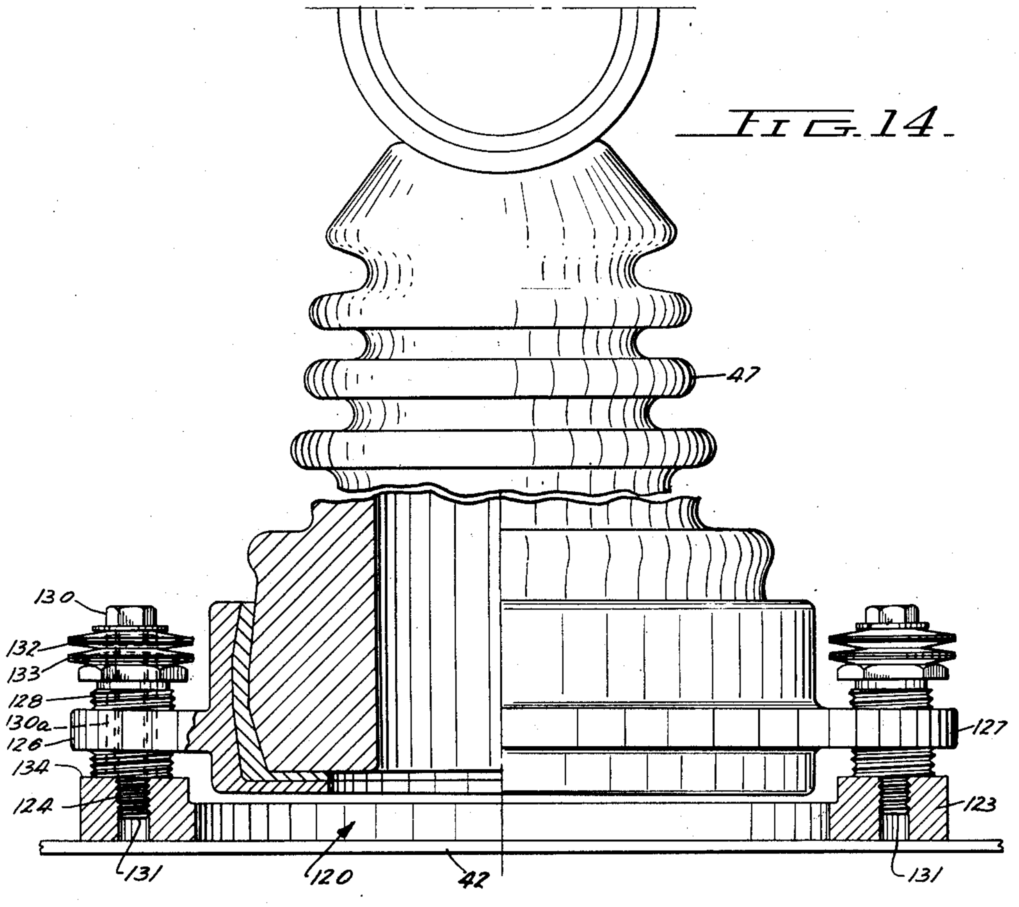
Figure 14 is a side cross sectional view showing the complete support for a single insulator.
Figure 13:
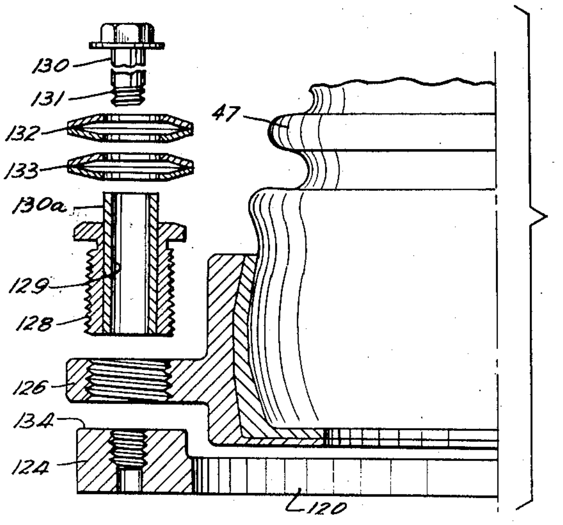
Figure 13 is an exploded side cross sectional view which indicates the manner in which my novel flexible connection between the insulator and the housing is achieved.

This particular construction may be further seen in Figures 13 and 14 wherein Figure 13 shows the typical construction of any one of the fastening means carried by the insulator base 47. Thus, the adjusting screw 128 is threaded to cooperate with the thread in lug 126 and has an aperture 129 therethrough for receiving the spacer **130*a* and fastening screw 130 which has threads 131 for cooperating with the threads 124 in the mounting base 123**.

Interposed between the head of adjusting screw 128 and fastening screw 130 are the spring type washers 132 and 133. The washers 132 and 133, therefore, operate to bias the end of adjusting screw 128 into engagement with surface 134 of the mounting base 123. Hence, if insulator 47 is now subjected to a counterclockwise bending stress, lug 126 will bring adjusting screw 128 into deflecting engagement with the washers 132 and 133, thereby substantially decreasing the bending stress within insulator 47 in view of the compression of spring means 132 and 133.

In a like manner, a washer connection associated with the fastening screw to the right of insulator 47 will provide the flexible connection for rotation of insulator 47 in a clockwise direction.

In the most general case, it is understood that if insulator 47 were mounted by at least three fastening means of the type shown in Figures 13 and 14, bending stress in any direction will be accommodated by a flexing of insulator 47 to some new angular position. In addition to providing a novel flexibly supported connection for the insulator 47 of Figures 13 and 14, my novel fastening between the insulator and its support housing will allow for adjustment of the insulator position in both a radial and angular direction, in view of the threaded connection between the adjusting screw 128 and lug 126. Hence, if it is desired to adjust the position of insulator 47 in a radial direction so as to increase or decrease the compression thereon, each of the adjusting screws such as adjusting screw 128 for each of the mounting lugs of the insulator merely need be located accordingly.

In a similar manner, the angular position of insulator 47 may be controlled by selectively adjusting the position of one or more adjusting screws with respect to their cooperating insulator support lug.

*Disconnect switch*

Figure 15:
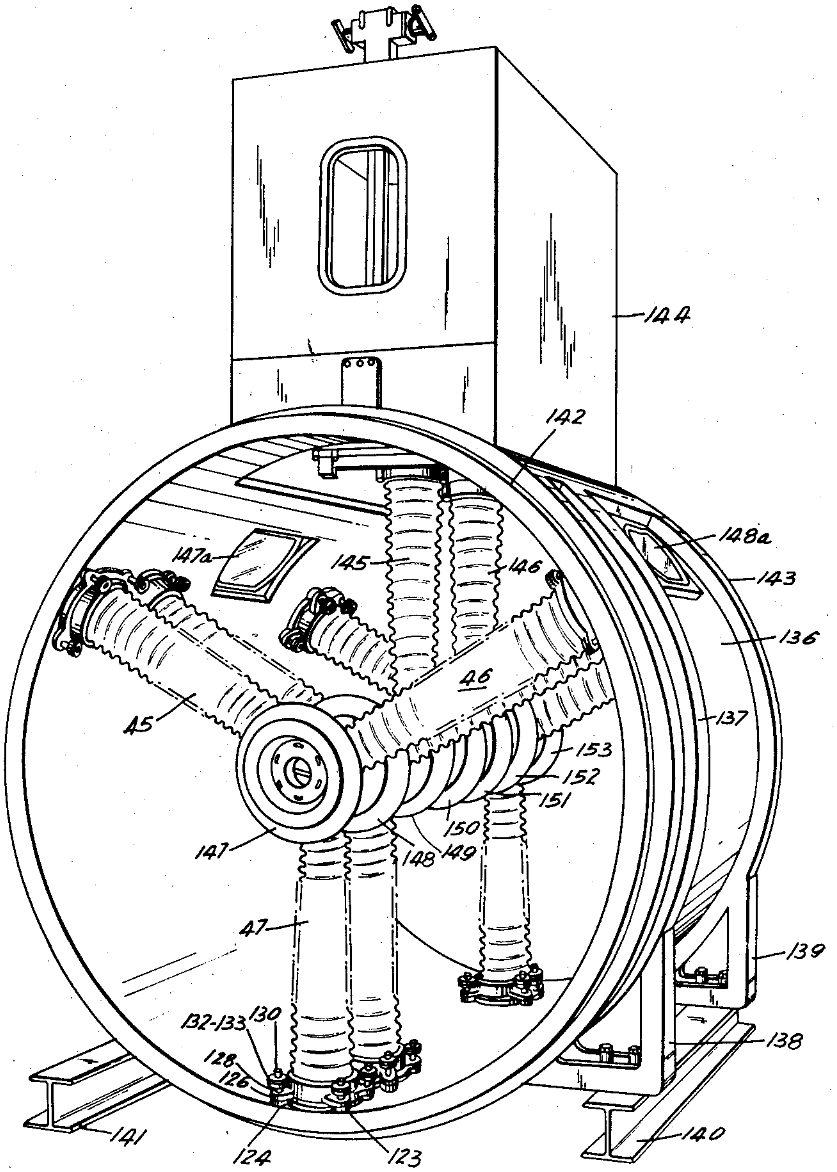
Figure 15 is a perspective view of my novel disconnect switch and the manner in which it is housed within my novel high voltage bus structure.
Figure 16:
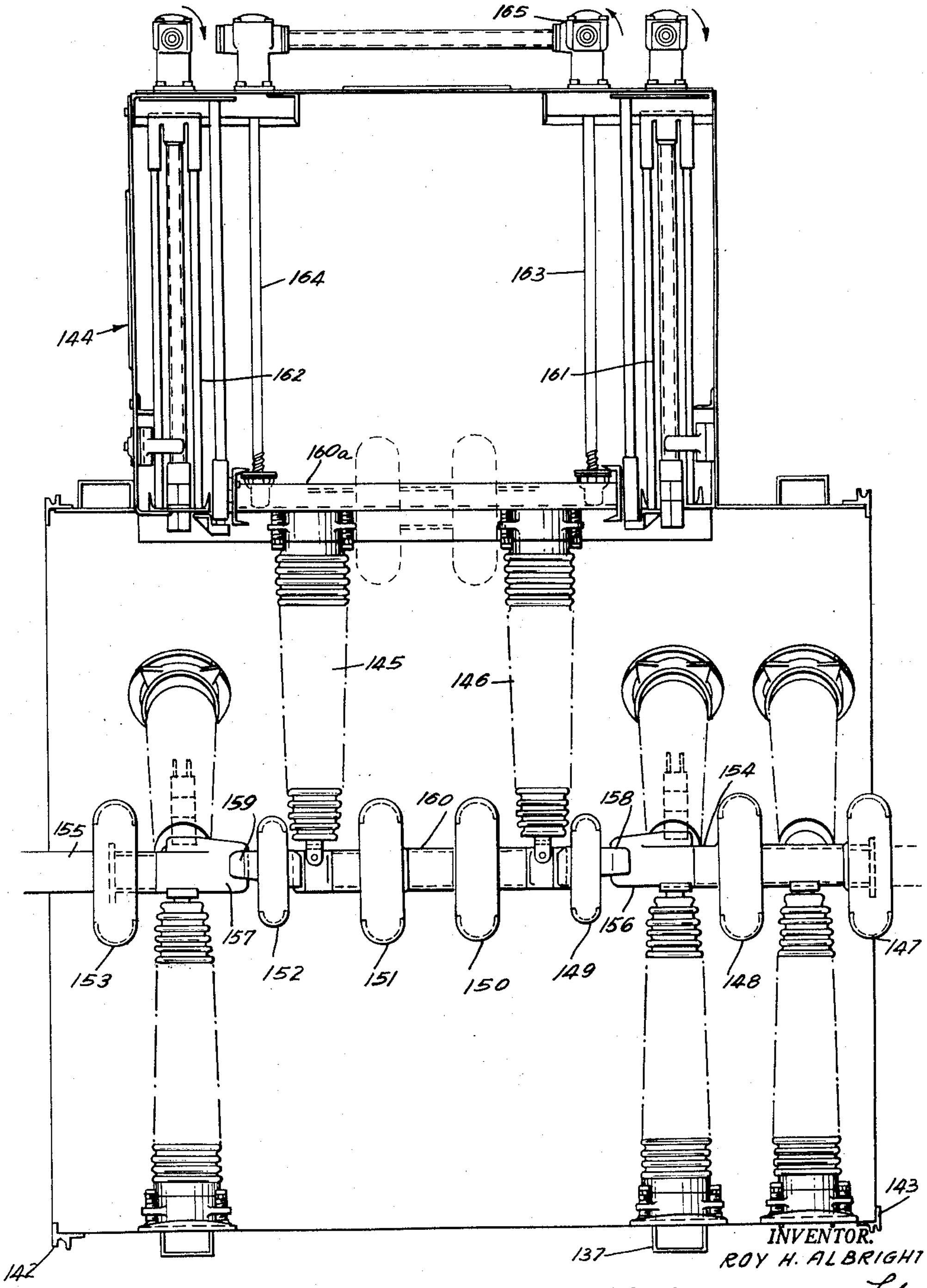
Figure 16 is a side view of the disconnect switch of Figure 15.
Figure 17:
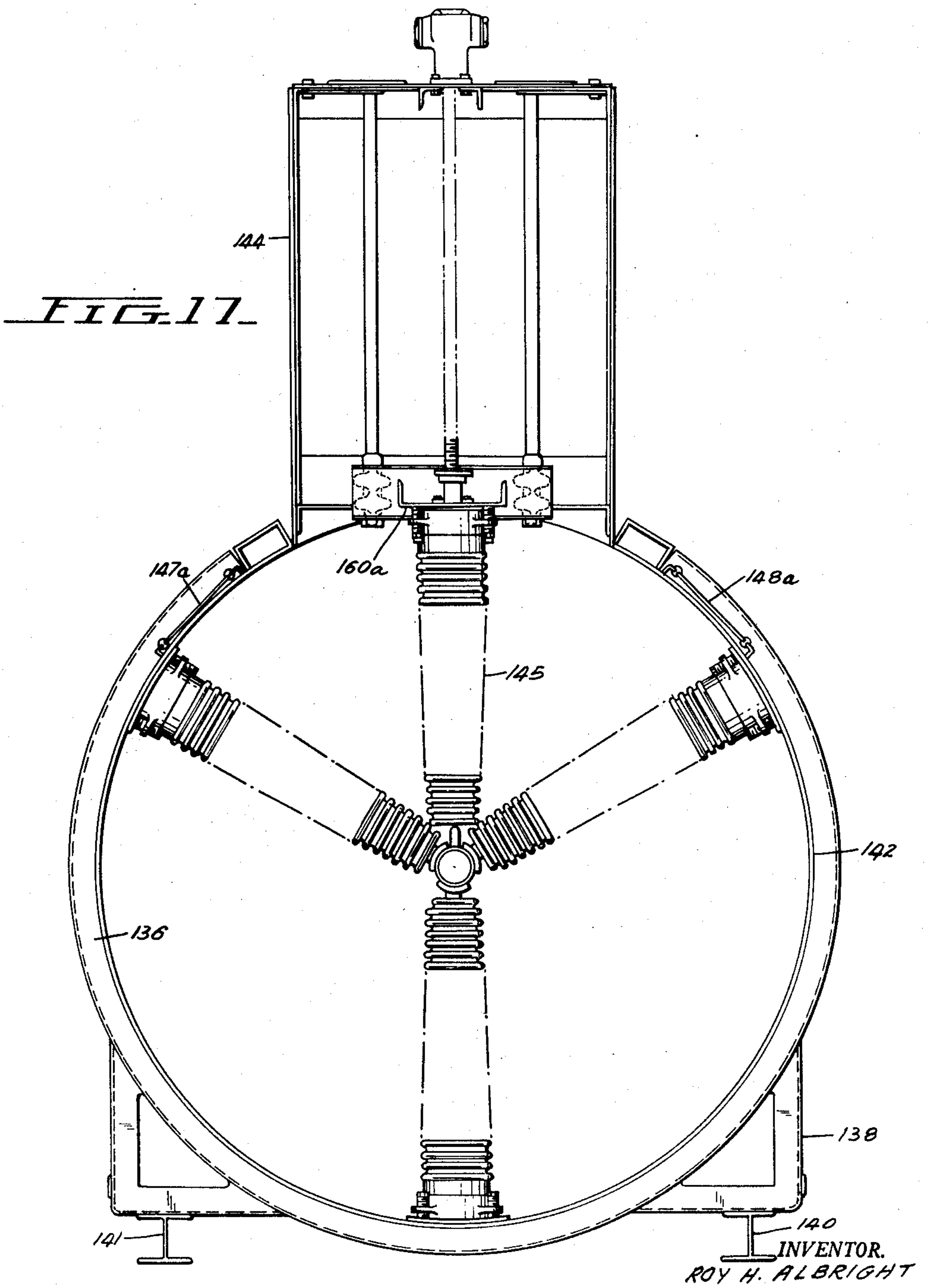
Figure 17 is a front view of the disconnect switch of Figure 15.

A novel disconnect switch to be utilized with the high voltage bus structure described heretofore is shown in conjunction with Figures 15, 16 and 17. Referring first to the perspective view of Figure 15, the disconnect switch is mounted within a housing 136 which has a reinforcing ring 137 thereon to reinforce the housing in the manner described hereinbefore. In a like manner, mounting feet 138 and 139 are adjustably connected to longitudinal support member 140 while similar mounting feet on the other side of the bus are mounted to the longitudinal support member 141. Longitudinal support members 140 and 141 are then mountable to transverse structural support members for supporting the housing section 136 in the manner described above.

Each end of the housing 136 is then provided with ring members 142 and 143 which will allow connection between the housing 136 and adjacent housing in the manner described hereinbefore in connection with Figures 11, 12 and 13. At the top of housing 136 is connected the disconnect switch operating mechanism housing 144 which supports the switch blade insulator 145 and 146 as will be described more fully in conjunction with Figures 16 and 17. Observation windows **147*a* and 148*a* are then provided in housing 136** so as to indicate the position of the switch blade.

Corona shields 147, 148, 149, 150, 151, 152 and 153 are connected along the switch and its adjacent bus structure as will be described more fully hereinafter.

Thus, the housing construction and the manner in which the two adjacent housings are connected together is the same for the case of disconnect switch housings as was true of the normal bus run housings described heretofore. In a like manner, the insulators of the disconnect switch housing are flexibly and adjustably connected to the housing wall as described above in conjunction with Figures 12, 13 and 14.

As seen in Figures 16 and 17, bus bars 154 and 155 are provided with jaw ends 156 and 157, respectively, at the ends thereof. Jaw ends 156 and 157 cooperate with ends 158 and 159 of the switch blades 160. Switch blades 160 are then rigidly connected to insulators 146 and 145 which are in turn connected to the channel member **160*a*. Channel member 160*a* is then slidably connected to guide posts such as the guide posts 161 and 162 of Figure 16 which guide the motion of channel 160*a* when the operating screws 163 and 164 are rotated by the operating mechanism 165**.

Hence, upon rotation of mechanism 165, screws 163 and 164 are rotated to draw channel **160*a* and its support insulators 145 and 146 and the switch blade 160** to the dotted position shown in Figure 16 to thereby completely open the disconnect switch.

The corona rings 147 through 153 serve to reduce corona discharge and to raise the insulation level. It is seen that these corona rings are arranged on each side of the insulators so as to shield conductor parts, raised parts and insulator members supporting these parts. These rings along with all other conductor members are made with large sectional radii so as to reduce the intensity of the electric field at the surface of the ring and conductors. Furthermore, the corona rings are made concentric so that a uniform electric field exists at the periphery thereof.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A high voltage metal enclosed bus structure comprising a metal housing, a bus and a plurality of insulating support means axially spaced along said housing; each of said insulating support means being directly and individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery thereof for imparting rigidity to said housing; each of said plurality of axially spaced annular shaped reinforcing members being in registry with a corresponding one of said plurality of insulating support means to thereby impart rigidity to said housing at a point of highest stress.

2. A high voltage metal enclosed bus structure comprising a metal housing, a bus and insulating support means; said insulating support means being directly mounted on said housing to support said bus from said housing in insulated relationship therewith; said housing comprising a cylindrical continuous body having an annular shaped reinforcing member fastened to the periphery thereof; said annular shaped reinforcing members being coaxial with the position of said insulating support means to thereby impart rigidity to said housing at a point of highest stress; mounting members for mounting said housing on a support structure; said mounting members being fastened to said annular shaped reinforcing member.

3. A high voltage metal enclosed bus structure comprising a metal housing, a bus and a plurality of insulating support means axially spaced along said housing; each of said insulating support means being directly and individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery thereof for imparting rigidity to said housing; each of said plurality of axially spaced annular shaped reinforcing members being in registry with a corresponding one of said plurality of insulating support means to thereby impart rigidity to said housing at a point of highest stress; mounting members for mounting said housing; said mounting members being fastened to said annular shaped reinforcing members.

4. A high voltage metal enclosed bus structure comprising a metal housing, a bus and a plurality of insulating support means axially spaced along said housing; each of said insulating support means being individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery thereof for imparting rigidity to said housing; each of said plurality of axially spaced annular shaped reinforcing members being in registry with a corresponding one of said plurality of insulating support means to thereby impart rigidity to said housing at a point of highest stress; mounting members for mounting said housing; said mounting members being fastened to said annular shaped reinforcing members; said mounting members of each of said annular shaped reinforcing members being fastened to a common longitudinal structural member; said longitudinal structural member being constructed to be connnected to transverse structural members for supporting said bus structure.

5. A high voltage metal enclosed bus structure comprising a metal housing, a bus and a plurality of insulating support means axially spaced along said housing; each of said insulating support means being individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery thereof for imparting rigidity to said housing; each of said plurality of axially spaced annular shaped reinforcing members being in registry with a corresponding one of said plurality of insulating support means to thereby impart rigidity to said housing at a point of highest stress; mounting members for mounting said housing; said mounting members being fastened to said annular shaped reinforcing members; said mounting members of each of said annular shaped reinforcing members being fastened to a common longitudinal structural member; said longitudinal structural member being constructed to be connnected to transverse structural members for supporting said bus structure; the connnections between said housing, mounting means, longitudinal and transverse structural members being constructed to adjustably position and adjustably maintain said housing with respect to said transverse structural member.

6. A high voltage metal enclosed bus structure comprising a metal housing having a bus supported therein in insulated relation with said metal housing; said housing comprising a cylindrical continuous body having an annular shaped reinforcing member fastened to the periphery thereof; a plurality of axially spaced mounting members for mounting said bus structure; each of said plurality of mounting members being supported by said housing and being fastened to a common longitudinal structural member; said longitudinal structural member being constructed to be connnected to transverse structural members for supporting said bus structure; the connections between said housing, mounting means, longitudinal and transverse structural members being constructed to adjustably position and adjustably maintain said housing with respect to said transverse structural member.

7. A high voltage metal enclosed bus structure comprising a metal housing, a bus and a plurality of insulating support means axially spaced along said housing; each of said insulating support means being individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery thereof for imparting rigidity to said housing; each of said plurality of axially spaced annular shaped reinforcing members being in registry with a corresponding one of said plurality of insulating support means to thereby impart rigidity to said housing at a point of highest stress; mounting members for mounting said housing; said mounting members being fastened to said annular shaped reinforcing members; said mounting members of each of said annular shaped reinforcing members being fastened to a common longitudinal structural member; said longitudinal structural member being constructed to be connected to transverse structural members for supporting said bus structure; said longitudinal and transverse structural members having slots therein; said slots in said longitudinal bus being perpendicular to said slots in said transverse structural member; said longitudinal and transverse structural members being connected to one another and adjustably positioned with respect to one another by connecting means passed through said slots.

8. A high voltage metal enclosed bus structure comprising a metal housing, a bus and a plurality of insulating support means axially spaced along said housing; each of said insulating support means being individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery thereof for imparting rigidity to said housing; each of said plurality of axially spaced annular shaped reinforcing members being in registry with a corresponding one of said plurality of insulating support means to thereby impart rigidity to said housing at a point of highest stress; mounting members for mounting said housing; said mounting members being fastened to said annular shaped reinforcing members; said mounting members of each of said annular shaped reinforcing members being fastened to a common longitudinal structural member; said longitudinal structural member being constructed to be connected to transverse structural members for supporting said bus structure; said longitudinal and transverse structural members having slots therein; said slots in said longitudinal bus being perpendicular to said slots in said transverse structural member; said longitudinal and transverse structural members being connected to one another and adjustably positioned with respect to one another by connecting means passed through said slots; said longitudinal members connected to said mounting members being adjustably positioned with respect to said housing in a direction perpendicular to the axis of said housing.

9. A high voltage metal enclosed bus structure comprising a metal housing, a bus and a plurality of insulating support means axially spaced along said housing; each of said insulating support means being individually mounted on said housing to support said bus at a plurality of axially spaced locations from said housing in insulated relationship therewith; said housing comprising a continuous body formed of a plurality of welded sections; said continuous housing body having a plurality of axially spaced annular shaped reinforcing members fastened to the periphery thereof for imparting rigidity to said housing; each of said plurality of axially spaced annular shaped reinforcing members being in registry with a corresponding one of said plurality of insulating support means to thereby impart rigidity to said housing at a point of highest stress; mounting members for mounting said housing; said mounting members being fastened to said annular shaped reinforcing members; said mounting members of each of said annular shaped reinforcing members being fastened to a common longitudinal structural member; said longitudinal structural member being constructed to be connected to transverse structural members for supporting said bus structure; said longitudinal members connnected to said mounting members being adjustably positioned with respect to said housing in a direction perpendicular to the axis of said housing.

10. A high voltage metal enclosed bus structure comprising a metal housing having a bus supported therein in insulated relation with said metal housing; said housing comprising a cylindrical continuous body having an annular shaped reinforcing member rigidly and permanently fastened to the periphery thereof for imparting rigidity to said housing; said annular shaped reinforcing member being further positioned at one end of said housing and being constructed to receive gasket and clamping means for connecting said housing to an adjacent bus housing.

11. A high voltage metal enclosed bus structure comprising a metal housing having a bus supported therein in insulated relation with said metal housing; said housing comprising a continuous body formed of a plurality of welded sections; said continuous housing body having a plurality of axially spaced annular shaped reinforcing members rigidly and permanently fastened to the periphery thereof for imparting rigidity to said housing; at least one of said annular shaped reinforcing members being positioned at one end of said housing and being further constructed to receive connecting means for connecting said housing to an adjacent bus housing; said connecting means including a gasket constructed to provide a moisture proof expandable seal between said housing and said adjacent housing; said clamping means providing mechanical connection between said housings.

12. A high voltage metal enclosed bus structure comprising a metal housing having a bus supported therein in insulated relation with said metal housing; said housing comprising a continuous body formed of a plurality of welded sections; said continuous housing body having a plurality of axially spaced annular shaped reinforcing members rigidly and permanently fastened to the periphery thereof for imparting rigidity to said housing; at least one of said annular shaped reinforcing members being positioned at one end of said housing and being further constructed to receive connecting means for connecting said housing to an adjacent bus housing; said connecting means including a gasket constructed to provide a moisture proof expandable seal between said housing and said adjacent housing; said clamping means providing mechanical connection between said housings; said clamping means being electrically insulated from said housing and forming a continuation of the metallic shield formed by said metal housings.

13. A high voltage metal enclosed bus structure comprising a metal housing having a bus supported therein in insulated relation with said metal housing; said housing comprising a continuous body formed of a plurality of welded sections; said continuous housing body having a plurality of axially spaced annular shaped reinforcing members rigidly and permanently fastened to the periphery thereof for imparting rigidity to said housing; at least one of said annular shaped reinforcing members being positioned at one end of said housing and being further constructed to receive connecting means for connecting said housing to an adjacent bus housing; said connecting means including a clamping means concentrically positioned with respect to said housings for mechanically connecting and aligning said housings.

14. A high voltage metal enclosed bus structure comprising a metal housing having a bus supported therein in insulated relation with said metal housing; said housing comprising a continuous body formed of a plurality of welded sections; said continuous housing body having a plurality of axially spaced annular shaped reinforcing members rigidly and permanently fastened to the periphery thereof for imparting rigidity to said housing; at least one of said annular shaped reinforcing members being positioned at one end of said housing and being further constructed to receive connecting means for connecting said housing to an adjacent bus housing; said connecting means including a gasket constructed to provide a moisture proof expandable seal between said housing and said adjacent housing; said clamping means providing mechanical connection between said housings; said clamping means being externally and coaxially positioned with respect to said gasket to protect said gasket from damage.

15. A high voltage metal enclosed bus structure comprising a metal housing having a bus supported therein in insulated relation with said metal housing; said housing comprising a continuous body formed of a plurality of welded sections; said continuous housing body having a plurality of axially spaced annular shaped reinforcing members rigidly and permanently fastened to the periphery thereof for imparting rigidity to said housing; at least one of said annular shaped reinforcing members being positioned at one end of said housing and being further constructed to receive connecting means for connecting said housing to an adjacent bus housing; said connecting means including a clamping means concentrically positioned with respect to said housings for mechanically connecting and aligning said housings; said clamping means comprising a plurality of sections connectible to form a concentric ring about the junction of said housings; said clamping means transmitting an evenly distributed radial pressure to the ends of said housings.

16. A high voltage metal enclosed bus structure comprising a metal housing, a bus and an insulator support; connecting means for connecting one end of said insulator support to said housing, said bus bar being supported in insulated relationship with respect to said housing at the other end of said insulator; said connecting means being resiliently fastened to said housing to permit angular and radial deflection of said insulator to thereby absorb radial and cantilever stress, said connecting means being further constructed to adjustably position said insulator in an angular and radial direction.

17. A high voltage metal enclosed bus structure comprising a metal housing, a bus and an insulator support; said housing comprising a cylindrical continuous body having an annular shaped reinforcing member fastened to the periphery thereof, connecting means for connecting one end of said insulator support to said housing, said bus bar being supported in insulated relationship with respect to said housing at the other end of said insulator; said connecting means being resiliently fastened to said housing to permit angular and radial deflection of said insulator to thereby absorb radial and cantilever stress; said connecting means being further constructed to adjustably position said insulator in an angular and radial direction.

18. A high voltage metal enclosed bus structure comprising a metal housing, a bus and an insulator support; said housing comprising a cylindrical continuous body having an annular shaped reinforcing member fastened to the periphery thereof, connecting means for connecting one end of said insulator support to said housing, said bus bar being supported in insulated relationship with respect to said housing at the other end of said insulator; said connecting means being resiliently fastened to said housing to permit angular and radial deflection of said insulator to thereby absorb radial and cantilever stress; said connecting means being further constructed to adjustably position said insulator in an angular and radial direction; said annular shaped reinforcing members being coaxially positioned with said insulator connecting means.

19. A high voltage metal enclosed bus structure comprising a metal housing, a bus and a plurality of radially disposed insulator supports; a plurality of connecting means for respectively connecting one end of each insulator support to said housing; said bus bar being supported in insulated relationship with respect to said housing by the other ends of each of said insulators; each of said connecting means being resiliently fastened to said housing to permit angular and radial deflection of its respective insulator responsive to radial and cantilever stress; each of said connecting means being further constructed to adjustably position said insulator in an angular and radial direction.

20. A high voltage metal enclosed bus structure comprising a metal housing, a bus and a plurality of radially disposed insulator supports; said housing comprising a cylindrical continuous body having an annular shaped reinforcing member fastened to the periphery thereof; a plurality of connecting means for respectively connecting one end of each insulator support to said housing; said bus bar being supported in insulated relationship with respect to said housing by the other ends of each of said insulators; each of said connecting means being resiliently fastened to said housing to permit angular and radial deflection of its respective insulator responsive to radial and cantilever stress; each of said connecting means being further constructed to adjustably position said insulator in an angular and radial direction.

21. A high voltage metal enclosed bus structure comprising a metal housing, a bus and a plurality of radially disposed insulator supports; said housing comprising a cylindrical continuous body having an annular shaped reinforcing member fastened to the periphery thereof; a plurality of connecting means for respectively connecting one end of each insulator support to said housing; said bus bar being supported in insulated relationship with respect to said housing by the other ends of each of said insulators; each of said connecting means being resiliently fastened to said housing to permit angular and radial deflection of its respective insulator responsive to radial and cantilever stress; each of said connecting means being further constructed to adjustably position said insulator in an angular and radial direction; said annular shaped reinforcing members being coaxially positioned with said insulator connecting means to thereby reinforce said housing at a point of relatively high stress.

22. A high voltage metal enclosed bus structure comprising a metal housing, a bus and an insulator support; connecting means for connecting one end of said insulator support to said housing, said bus bar being supported in insulated relationship with respect to said housing at the other end of said insulator; said connecting means being resiliently fastened to said housing to permit angular and radial deflection of said insulator to thereby absorb radial and cantilever stress, said connecting means being further constructed to adjustably position said insulator in an angular and radial direction; said connecting means comprising a spring member and a bolt, one end of said bolt being fastened to said housing, the other end of said bolt being connected to said insulator through said spring member.

23. A high voltage metal enclosed bus structure comprising a metal housing, a bus and a plurality of radially disposed insulator supports; a plurality of connecting means for respectively connecting one end of each insulator support to said housing; said bus bar being supported in insulated relationship with respect to said housing by the other ends of each of said insulators; each of said connecting means being resiliently fastened to said housing to permit angular and radial deflection of its respective insulator responsive to radial and cantilever stress; each of said connecting means being further constructed to adjustably position said insulator in an angular and radial direction; said connecting means comprising a spring member and a bolt, one end of said bolt being fastened to said housing, the other end of said bolt being connected to said insulator through said spring member.

References Cited in the file of this patent

UNITED STATES PATENTS

| | | |
|---|---|---|
| 2,229,006 | Rudd | Jan. 14, 1941 |
| 2,275,203 | Rudd | Mar. 3, 1942 |
| 2,396,131 | Scott | Mar. 5, 1946 |
| 2,469,445 | Scott | May 10, 1949 |
| 2,517,435 | Jensen | Aug. 1, 1950 |
| 2,746,780 | Comino | May 22, 1956 |
| 2,775,643 | Scott | Dec. 25, 1956 |
| 2,783,299 | Schymik | Feb. 26, 1957 |